UNITED STATES PATENT OFFICE.

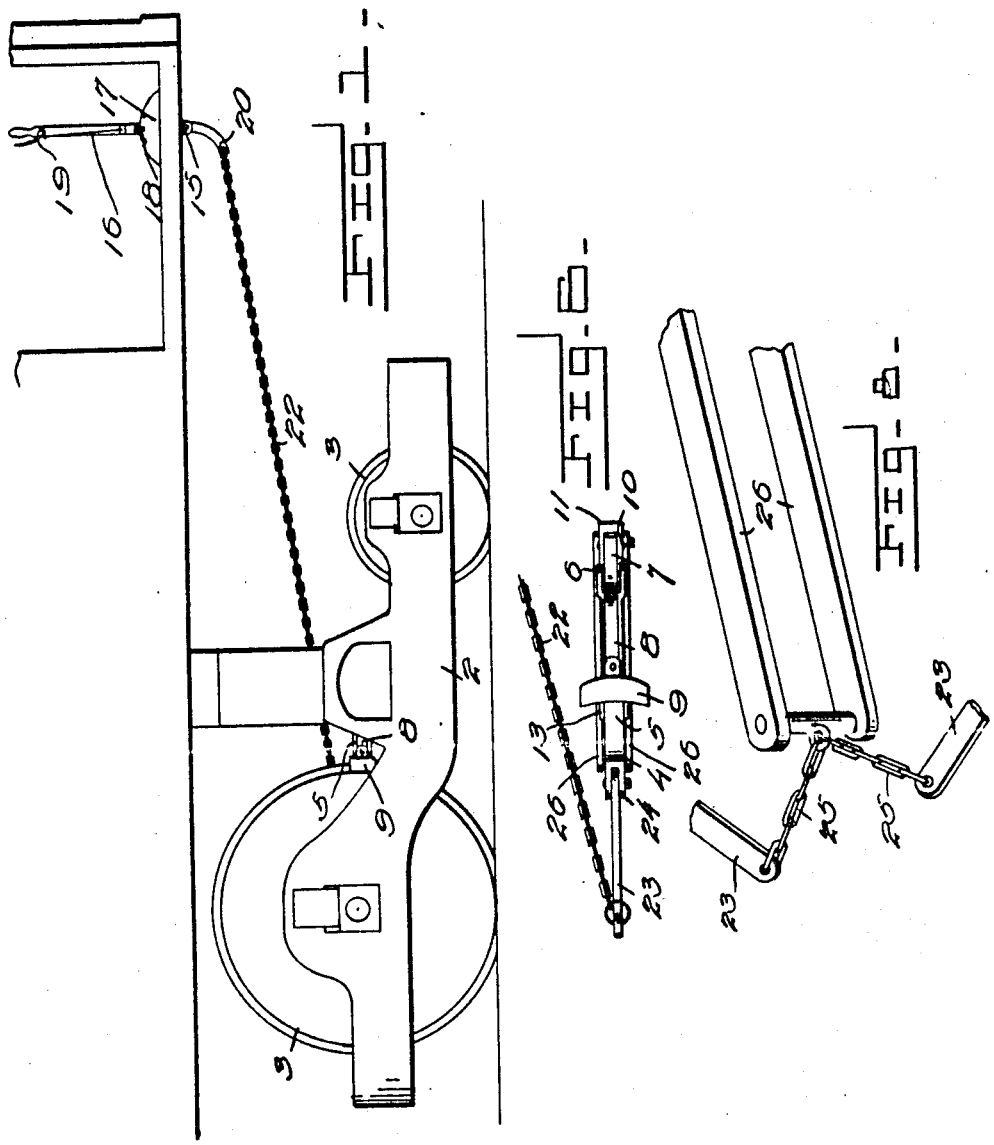

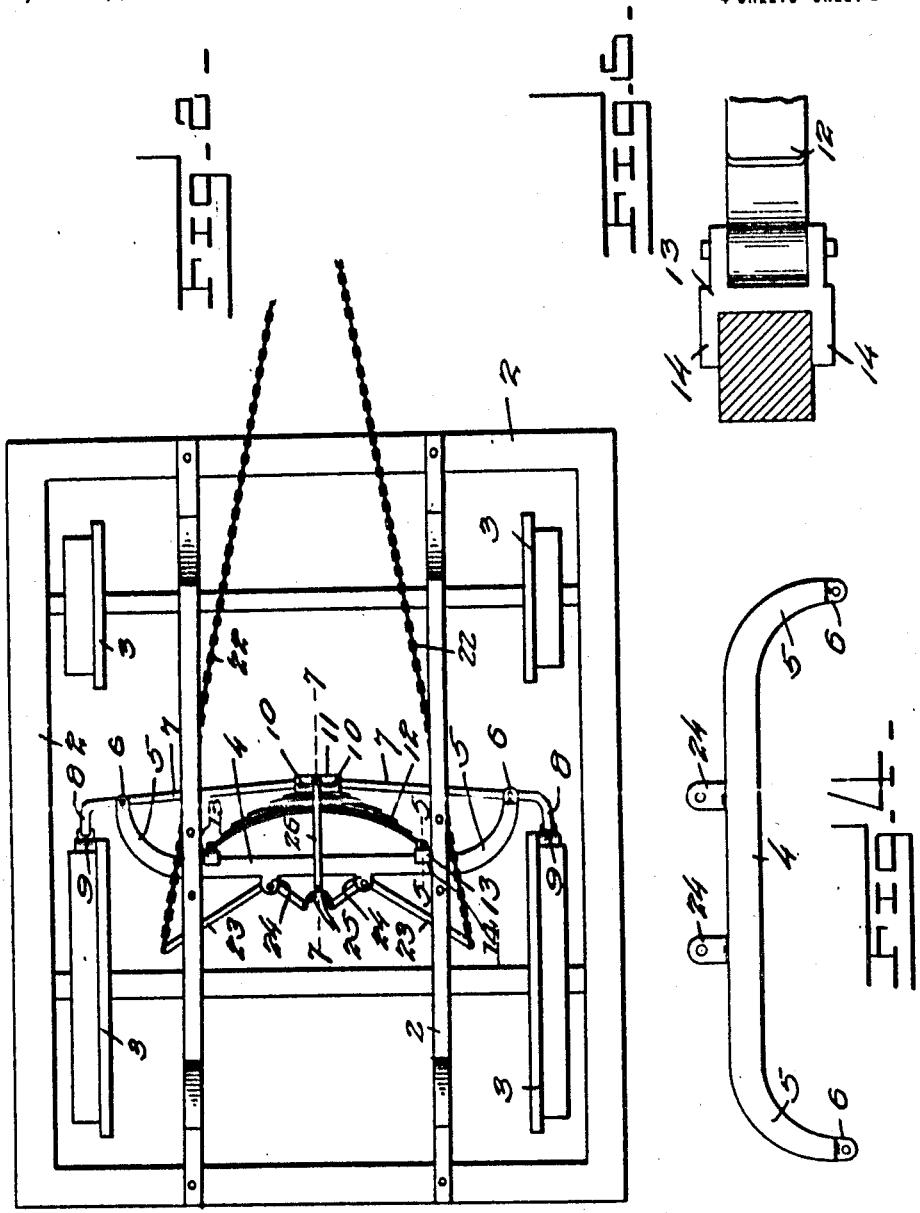

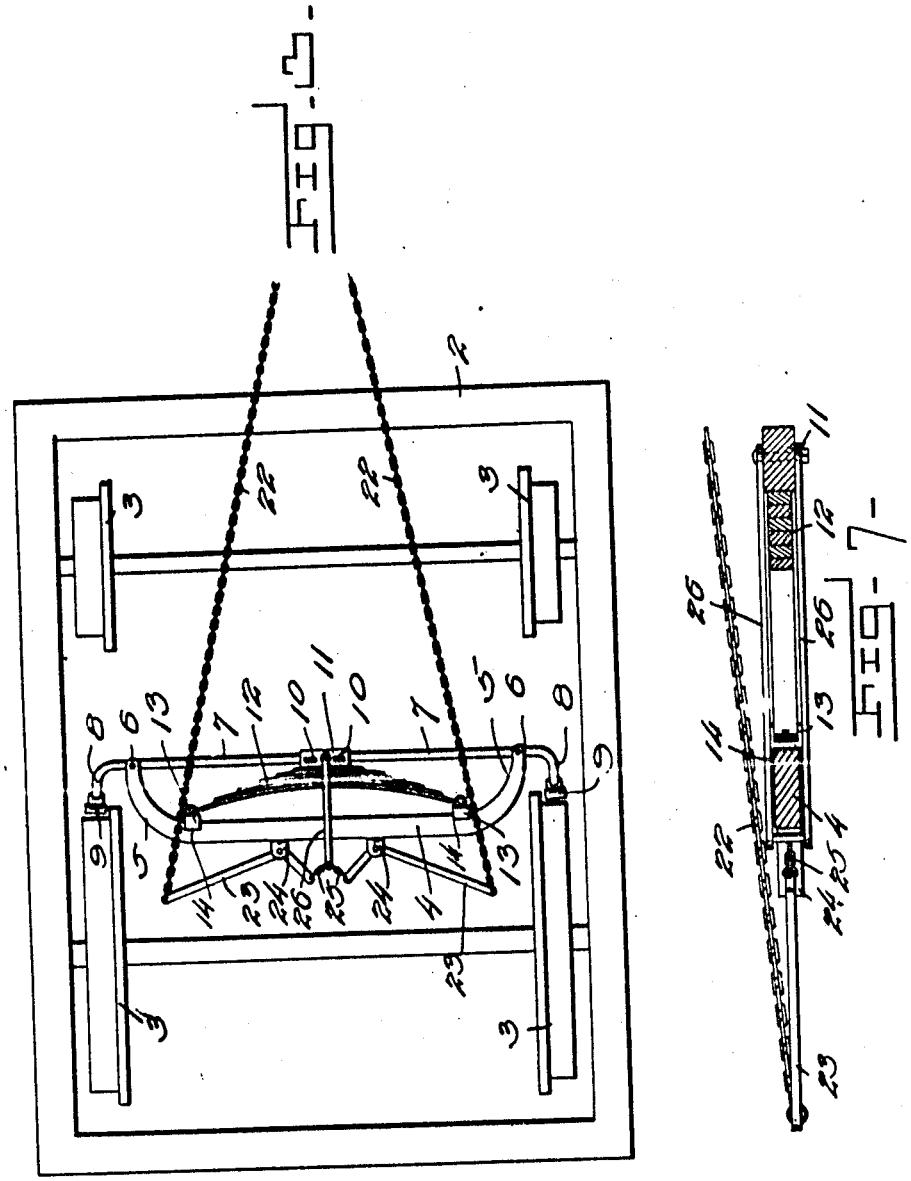

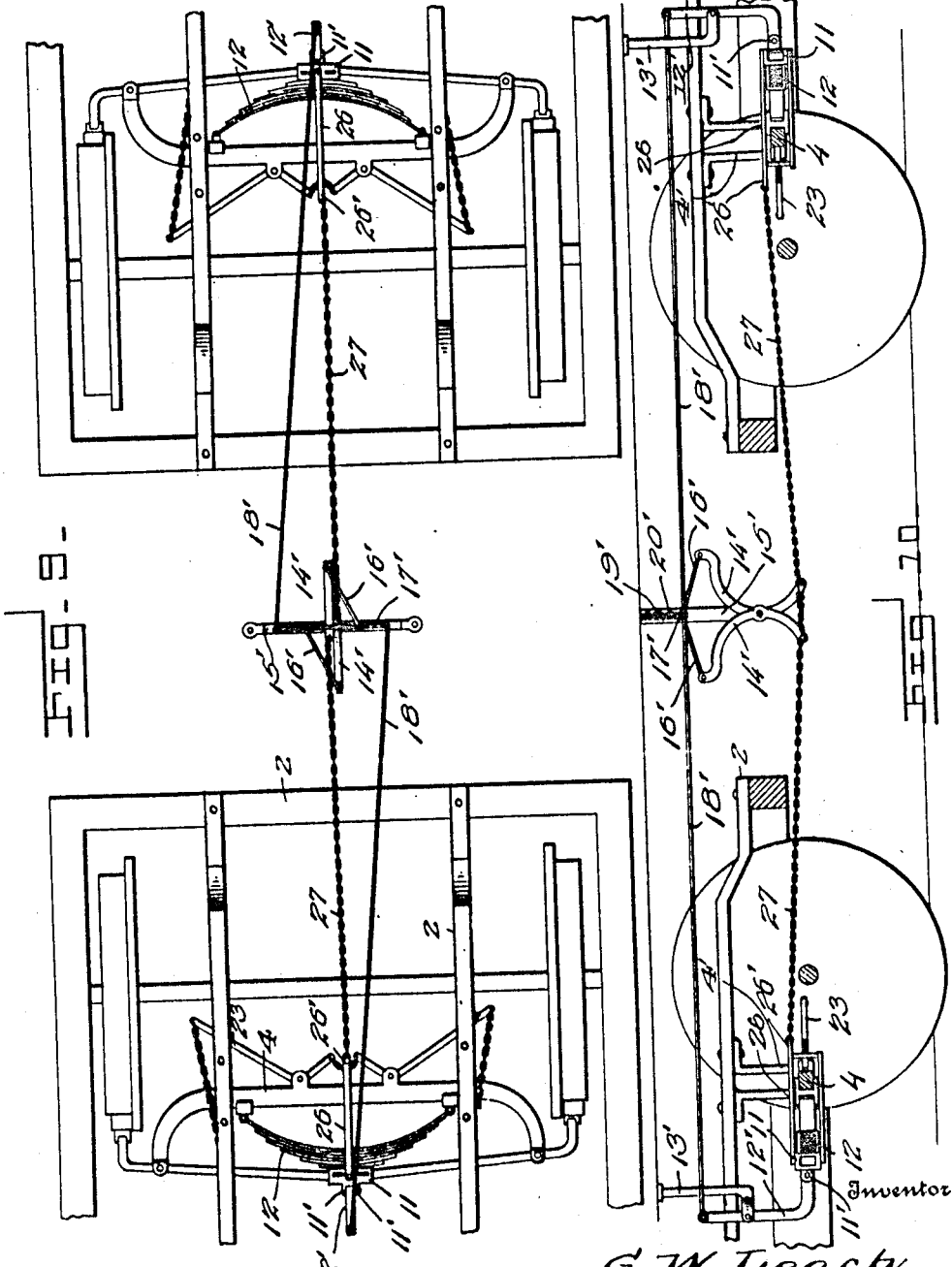

GEORGE W. LEACH, OF PITTSBORO, NORTH CAROLINA.

CAR-BRAKE.

1,185,109.  Specification of Letters Patent.  Patented May 30, 1916.

Application filed May 3, 1912.  Serial No. 694,959.

*To all whom it may concern:*

Be it known that I, GEORGE W. LEACH, a citizen of the United States, residing at Pittsboro, in the county of Chatham and State of North Carolina, have invented certain new and useful Improvements in Car-Brakes, of which the following is a specification.

My invention relates to improvements in brakes, and has for its leading object the provision of an improved form of brake particularly adapted for use upon motor or trolley cars.

A further object of my invention is the provision of an improved form of brake which may be easily applied to stop the car in that its normal position is in locking engagement with the wheels of the car and the movement of the controlling lever by the motorman serves the purpose of rendering the brake inoperative in place of applying the brake through said lever as is usually the case.

Another object of my invention is the provision of an improved spring actuated car brake in which a single brake may be employed to serve both as the ordinary controlling brake of the car and also as the emergency brake when it is desired to suddenly check the said car.

Other objects and advantages of my improved car brake will be readily apparent by reference to the following description taken in connection with the accompanying drawings, and it will be understood that I may make any modifications in the specific structure shown and described within the scope of my claims without departing from or exceeding the spirit of the invention.

Figure 1 represents a side view of a portion of car equipped with my improved brake. Fig. 2 represents a plan view of the brake in operating position. Fig. 3 represents a plan view of the same showing the parts locked in inoperative position. Fig. 4 represents a detailed view of the brake supporting member. Fig. 5 represents a sectional view on the line 5—5 of Fig. 2. Fig. 6 represents a side elevation of the brake device removed from the car. Fig. 7 represents a sectional view on the line 7—7 of Fig. 2, and Fig. 8 represents an enlarged detailed view of the connection of the operating links and levers. Fig. 9 represents a modified form of the invention, the same being shown as applied for operating the mechanism from both ends of the car, said view being a plan view. Fig. 10 represents a longitudinal sectional view of the same.

In the drawings, the numeral 1 designates the frame of the car having secured at the underside thereof the usual trucks 2 having the wheels 3 against which my brakes bear. Disposed between the trucks 2 is a supporting member 4 which is secured to the bottom of the car by hangers 4' as shown in the drawing, said supporting member 4 having the forwardly curved ends 5 thereof terminating in ears 6 to which are pivoted the lever arms 7. Said arms 7 have the curved ends 8 which bear the brake shoes 9 for engaging the wheels 3, while the other ends of said brake levers 7 are pivotally secured between the end portions 10 of the block 11. Said block 11 is secured centrally to the heavy leaf spring 12 which has on each end a slide block 13 provided with projecting flanges 14 fitting over the sides of the supporting member 4, as is most clearly shown in Fig. 5 of the drawings.

By reference to Fig. 2 of the drawings, it will be seen that the spring 12 normally assumes a considerable bow or curve and that the spring bearing at its end against the supporting member 4 will tend to force the block 11 away from the supporting member and thus to swing the levers 7 on their pivots at the ends of the supporting member, tightly forcing the brake shoes against the rims of the wheels 2.

It will be understood that to satisfactorily apply the brakes the spring must be possessed of great strength, although the great excess of length of the levers 7 over the end portions 8 will cause a greatly increased proportional amount of pressure to be expended by the brake shoes in comparison to the pressure of the spring against the block 11, and thus against the inner ends of the levers 7.

To control the application of the brakes and to enable me to partially straighten out the springs and thus move the brakes out of engagement with the wheels, I secure to the car the bracket 15 to which is pivoted near its lower end the lever 16 for operating the brakes. Said lever projects upward through the floor of the car into a position where it may be readily grasped by the motorman to shift the lever and apply or release the brakes. A rack plate 17 is secured to the car adjacent the brake lever, and the brake lever is provided with the spring pressed dog 18 controlled by the lever 19, said dog being adapted to engage the teeth of the rack plate to lock the lever in desired adjusted position to either entirely move the brake out of engagement with the car wheels or to allow the same to engage the wheels with partial pressure to gradually bring the car to a stop.

Passing through and rotatably engaged in the lower end of the lever 16 is the bolt 20 which engages the link members 22 which extend rearwardly beyond the supporting member 4. The other ends of said links 22 are pivotally secured to the outer ends of the lever 23, said levers being pivoted near their inner ends to the ears 24 which project rearwardly from the supporting member 4. The inner ends of the levers 23 have pivotally secured thereto the short links 25, the other ends of said links 25 being secured to the draw rod 26 which has its end secured centrally to the block 11.

From the foregoing description taken in connection with the drawings, the construction of my improved car brake will be readily understood, and it will be seen that on account of the arrangement of the various levers each having the long arm to which the power is applied and the short arm which serves to communicate the power or pressure to another device that but slight comparative force is required to be exerted on the lever 16 to compress the spring 12 to shift the brakes out of engagement with the car wheels. It will also be seen that as the block 11 is drawn rearwardly the guide members 13 will slide outward and toward the curved ends of the supporting member 4, and the supporting member thus serves both as a guide for the ends of the spring and also as a fulcrum for the brake levers and for the spring controlling levers.

It is evident that I have provided a simple brake mechanism which may be readily applied to an ordinary car without change in the construction of the said car, which brake will be thoroughly efficient in operation and can be instantly applied either to gradually check the car or as an emergency brake to lock the wheels against any movement.

In the modified form of the invention, and as shown in Fig. 9, the blocks 11 are provided with spaced ears 11′, and between which are pivotally connected the inner ends of the bars 12′, said bars being pivotally supported beneath the bottom of the car by brackets 13′. In this form the draw rods 26 are provided with extensions 26′ and to which are connected the outer ends of chains 27, the inner ends of said chains being connected to the inner ends of the oppositely curved arms 14′, said arms being pivotally connected to the U-shaped hanger 15′, and near their centers. To the outer ends of the arms 14′ are connected the outer ends of the links 16′, the inner ends of the same being pivotally connected intermediate the ends of the lever 17′, and at different points thereon.

Leading from the outer ends of the bars 12′ are links 18′, the inner ends of the same being pivotally connected to the outer ends of the lever 17′. The hanger chain 19′ is provided, the same having diverging sections 20′, each section being connected to one end of the lever 17′, while the upper end of the hanger 19′ is secured to the bottom of the car, thus effectually supporting the lever 17′ and its connection. Thus it will be seen that the brake mechanism by minor changes may be operated from both platforms of the car and in unison.

I claim:—

1. A car brake, comprising a supporting member adapted to be secured to a car truck frame, brake levers pivoted to the ends of the supporting member and to each other, brake shoes carried by the outer ends of the brake levers, a bowed leaf spring having its ends slidably secured to the supporting member, connections between the central portion of said spring and the connected ends of the brake levers, the curve of the spring being such as to cause the spring to normally shift the brake levers on their pivots to apply the brake shoes to the car wheels, and a controlling lever pivoted to the supporting member and to each of the first mentioned levers for straightening the spring to move the brake shoes out of engaging position.

2. A vehicle brake, comprising a supporting member adapted to be secured to a car truck frame, a bowed leaf spring having its ends slidably secured to the supporting member and its central portion curving outwardly therefrom, brake levers pivoted to the ends of the supporting member and having their inner ends pivotally secured together and to the spring, bell crank levers pivoted to the central portion of the supporting member, links connecting the central portions of the spring with said levers, and means for shifting said levers in unison on their pivots, whereby the rocking of said levers serves to flatten the spring and thus to rock the brake levers into inoperative position.

3. A car brake, comprising a brake beam having forwardly curving ends, brake levers pivoted to the ends of the brake beam and having brake shoes on their outer ends, a leaf spring having its ends slidably secured to the brake beam and having its central portion curving forward from the brake beam, a block secured to the central portion of the spring, the ends of the brake levers being pivoted to said block, and the curvature of the spring being such as to force the block and ends of the levers forward to shift the brake shoes on the outer ends of the levers into operative position, a pair of levers pivoted to the brake beam near their inner ends, connections between the block of the spring and the inner ends of the levers, an operating lever pivotally supported by the car, and links connecting the operating lever with the ends of the levers of the brake beam, whereby the shifting of the operating lever draws the outer ends of the brake beam lever forward and causes their inner ends to draw on the connections and flatten the spring, thus shifting the brake levers to move the brake shoes into inoperative position.

In testimony whereof I affix my signature, in the presence of two witnesses.

GEORGE W. LEACH.

Witnesses:
J. D. COWAN,
D. M. SMITH.

Copies of this patent may be obtained for five cents each, by addressing the "Commissioner of Patents, Washington, D. C."